(12) United States Patent
Allen et al.

(10) Patent No.: US 10,591,338 B2
(45) Date of Patent: Mar. 17, 2020

(54) WELDING FIXTURE

(75) Inventors: Charles Robert Allen, Houston, TX (US); Chae H. Ha, Houston, TX (US)

(73) Assignee: Daniel Measurement and Control, Inc., Houston, TX (US)

( * ) Notice: Subject to any disclaimer, the term of this patent is extended or adjusted under 35 U.S.C. 154(b) by 1140 days.

(21) Appl. No.: 14/413,626

(22) PCT Filed: Sep. 6, 2012

(86) PCT No.: PCT/US2012/053842
§ 371 (c)(1),
(2), (4) Date: Jan. 9, 2015

(87) PCT Pub. No.: WO2014/014482
PCT Pub. Date: Jan. 23, 2014

(65) Prior Publication Data
US 2015/0204707 A1 Jul. 23, 2015

Related U.S. Application Data

(60) Provisional application No. 61/673,018, filed on Jul. 18, 2012.

(51) Int. Cl.
G01F 1/66 (2006.01)
G01F 15/14 (2006.01)
(Continued)

(52) U.S. Cl.
CPC .............. G01F 15/14 (2013.01); B23K 31/02 (2013.01); B23K 37/04 (2013.01);
(Continued)

(58) Field of Classification Search
CPC .......... G01F 15/14; G01F 1/662; G01F 1/667; B23K 31/02; B23K 37/04; B23K 37/0426;
(Continued)

(56) References Cited

U.S. PATENT DOCUMENTS 1,924,121 A 8/1933 Jasper
3,761,005 A 9/1973 Baxter et al.
(Continued)

FOREIGN PATENT DOCUMENTS

CN 1478194 A 2/2004
CN 2677080 Y 2/2005
(Continued)

OTHER PUBLICATIONS

PCT/US2012/053843 International Search Report and Written Opinion dated Mar. 21, 2013 (9 p.).
(Continued)

*Primary Examiner* — Dana Ross
*Assistant Examiner* — Joseph M Baillargeon
(74) *Attorney, Agent, or Firm* — Conley Rose, P.C.

(57) ABSTRACT

A welding fixture for releasably engaging a weldable object includes a support body having a fluid passage, and a receiver coupled to the support body having an internal chamber that receives the object. At least one fluid delivery tube is disposed along the receiver and is in fluid communication with the fluid passage of the support body. The fixture allows the weldable object to be precisely positioned for welding, and supplies a fluid delivery system for delivering inert gas to the weld site.

26 Claims, 11 Drawing Sheets

(51) Int. Cl.
*B23K 31/02* (2006.01)
*B23K 37/04* (2006.01)
(52) U.S. Cl.
CPC .......... *B23K 37/0426* (2013.01); *G01F 1/662* (2013.01); *G01F 1/667* (2013.01)
(58) Field of Classification Search
CPC ....... B25B 1/00; B25B 1/2436; B25B 1/2431; B25B 3/00
USPC .......... 219/60 R, 60.2, 61, 61.1, 61.13, 61.3, 219/158, 160, 162, 659, 777, 161, 225, 219/230, 121.58, 521; 228/49.5, 49.3, 228/44.3–44.7, 49.1, 220, 219, 212, 213, 228/48, 44, 43; 29/594, 595, 609.1, 29/603.04, 603.12, 603.19, 603.17, 760, 29/56.6; 73/866.5, 431; 269/3, 6, 32, 20, 269/95
See application file for complete search history.

(56) References Cited

U.S. PATENT DOCUMENTS

| | | | |
|---|---|---|---|
| 4,097,712 | A | 6/1978 | Bezold |
| 4,168,406 | A | 9/1979 | Torrani |
| 4,177,676 | A * | 12/1979 | Welker ...................... G01F 1/10 73/198 |
| 5,310,982 | A | 5/1994 | Jusionis |
| 5,609,291 | A * | 3/1997 | Hummel ............ B23K 37/0531 219/61.1 |
| 5,962,952 | A | 10/1999 | Gluszyk et al. |
| 6,325,277 | B1 | 12/2001 | Collie |
| 8,733,188 | B2 | 5/2014 | Furlong et al. |
| 2003/0116238 | A1 | 6/2003 | Fujita et al. |
| 2005/0039545 | A1 | 2/2005 | Eldridge |
| 2010/0051672 | A1 * | 3/2010 | Nunnery ............ B23K 37/0531 228/212 |
| 2011/0041619 | A1 | 2/2011 | Delbos et al. |
| 2011/0162463 | A1 | 7/2011 | Allen |
| 2011/0314932 | A1 | 12/2011 | Straub, Jr. et al. |
| 2012/0048038 | A1 | 3/2012 | Furlong et al. |
| 2012/0125122 | A1 | 5/2012 | Gottlieb et al. |

FOREIGN PATENT DOCUMENTS

| | | |
|---|---|---|
| CN | 201189598 Y | 2/2009 |
| CN | 201483183 U | 5/2010 |
| CN | 102528347 A | 7/2012 |
| CN | 102563281 A | 7/2012 |
| CN | 203712137 U | 7/2014 |
| EP | 0344927 A1 | 12/1989 |
| EP | 1207003 A1 | 5/2002 |
| EP | 2202493 A1 | 6/2010 |
| EP | 2423556 A2 | 2/2012 |
| GB | 451409 A | 7/1936 |
| GB | 994437 A | 6/1965 |
| GB | 1157716 A | 7/1969 |
| GB | 1537236 A | 12/1978 |
| GB | 2218518 A | 11/1989 |
| JP | S5850192 A | 3/1983 |
| JP | S59109818 A | 6/1984 |
| JP | S59193771 A | 11/1984 |
| KR | 20120063232 A | 6/2012 |
| SU | 318204 A1 | 10/1971 |
| SU | 649526 A1 | 2/1979 |
| SU | 1493411 A1 | 7/1989 |
| WO | 2014/014482 A1 | 1/2014 |

OTHER PUBLICATIONS

Chinese Office Action dated Apr. 1, 2015 for Chinese Application No. 201310303231.5 (5 p.).
English Translation of Chinese Office Action dated Apr. 1, 2015 for Chinese Application No. 201310303231.5 (7 p.).
European Search Report dated Apr. 5, 2016, for European Application No. 12881465.4 (6 p.).
Russian Office Action dated May 30, 2016, for Russian Application No. 2015101342 (9 p.).
English Translation of Russian Office Action dated May 30, 2016, for Russian Application No. 2015101342 (9 p.).
Canadian Office Action dated May 30, 2016, for Canadian Application No. 2,879,420 (3 p.).
Russian Office Action dated May 17, 2016, for Russian Application No. 2015101343 (5 p.).
English Translation of Russian Office Action dated May 17, 2016, for Russian Application No. 2015101343 (4 p.).
Chinese Office Action dated Oct. 23, 2015; Chinese Application No. 201310303223.0 (6 p.).
English Translation of Chinese Office Action dated Oct. 23, 2015; Chinese Application No. 201310303223.0 (10 p.).
European Search Report dated Mar. 23, 2016; European Application No. 12881431.6 (5 p.).
PCT/US2012/053842 International Search Report and Written Opinion dated Mar. 29, 2013 (8 p.).
USPTO Office Action dated Feb. 3, 2017 for U.S. Appl. No. 14/413,644.
Chinese Office Action dated Jan. 6, 2015; Chinese Application No. 201310303223.0 (7 p.).
English Translation of Chinese Office Action dated Jan. 6, 2015; Chinese Application No. 201310303223.0 (10 p.).
Russian third office action dated Nov. 17, 2017, for patent application No. RU 2015101343.

* cited by examiner

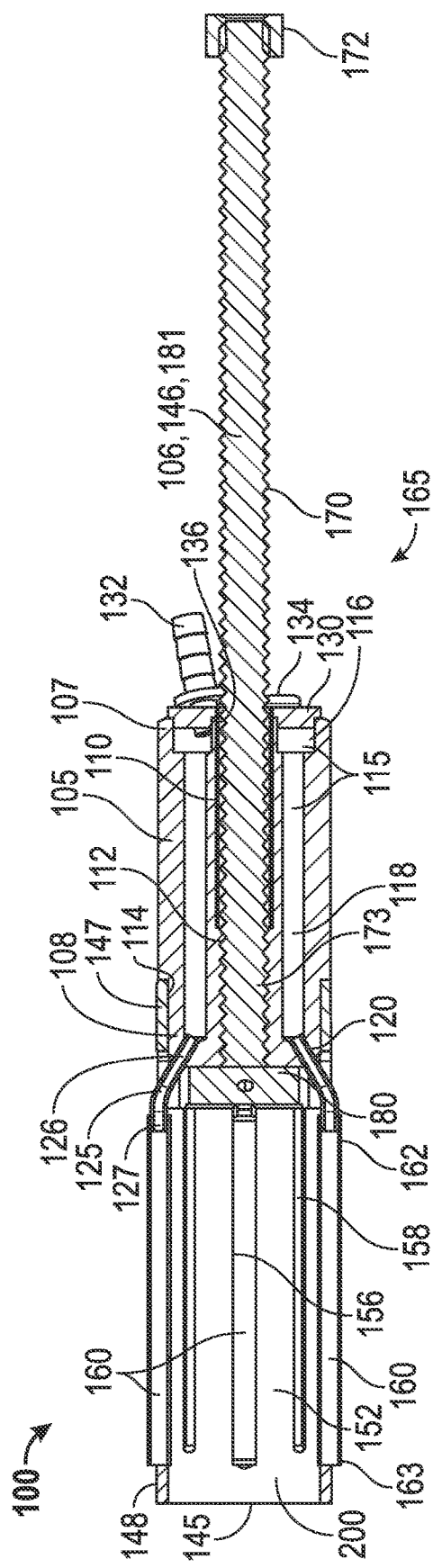
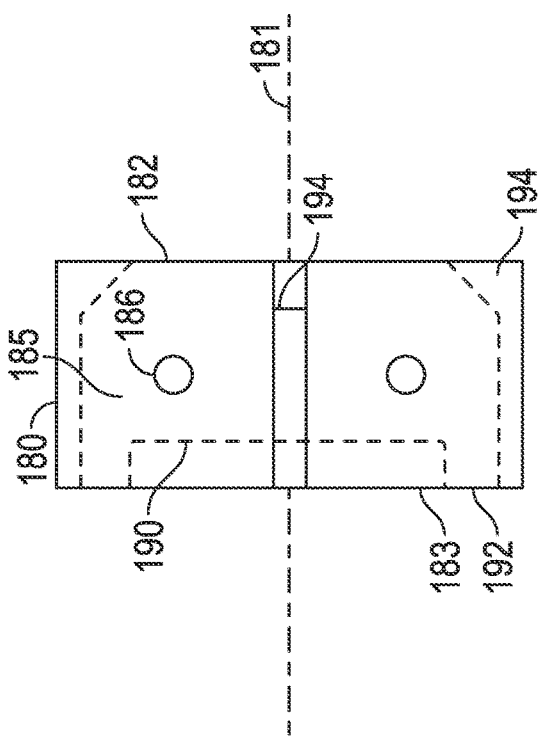
FIG. 5
FIG. 6

WELDING FIXTURE

CROSS-REFERENCE TO RELATED APPLICATIONS

This application is a 35 U.S.C. § 371 national stage application of PCT/US2012/053842 filed Sep. 6, 2012 and entitled "Welding Fixture," which claims priority to U.S. Provisional Application No. 61/673,018 filed Jul. 18, 2012 and entitled "Apparatus and Method for Forming a Welded Seal," both of which are hereby incorporated herein by reference in their entirety for all purposes.

STATEMENT REGARDING FEDERALLY SPONSORED RESEARCH OR DEVELOPMENT

Not applicable.

BACKGROUND

Field of the Disclosure

This disclosure relates generally to welding methods and apparatus used in welding. More particularly, the disclosure relates to the manufacturing of flow meters that measure parameters related to the flow of a liquid or a gas. Still more particularly, it relates to methods and apparatus for installing and sealing transducers in ultrasonic flow meters.

Background Information

Hydrocarbons, in both liquid and gas phases, are transported from place to place via pipelines, ships, and other containers. When the fluid changes hands, the event is called a "custody transfer." Custody transfers occur while the hydrocarbons are passed between one or more systems of pipelines, and while being loaded or off-loaded from a ship, for example. During custody transfers, it is particularly desirable to know accurately the amount of fluid flowing in a stream. Even where custody transfer is not taking place, measurement accuracy is desirable for record keeping and engineering evaluations, and in these situations, ultrasonic flow meters are commonly used.

An ultrasonic flow meter typically includes a meter body through which a fluid flows and two or more transducer assemblies, each secured inside a dedicated port in the flow meter body. The flow meter body may also be called a spool piece. To seal the fluid within the flow meter, a conventional transducer housing is threadingly secured within each port in the spool piece, and a transducer is sealed within the housing. Thus, the spool piece and transducers and transducer housings create a sealed container and pressure boundary that contains the fluid that is flowing through the meter.

The ports and transducers are arranged and positioned in pairs in the meter, and such that the transducers of the pair face each other from opposite sides of the fluid-carrying bore of the spool piece. When coupled within the transducer housings, the piezoelectric elements of the transducers are adjacent to the inner surface of the fluid-carrying bore. The transducers transmit and receive acoustic signals back-and-forth across the fluid stream. Each transducer is coupled to external electronics that alternately generate and interpret the electrical signals sent to and received from the piezoelectric elements of the transducers.

A mechanical seal is typically used to seal the transducer housing into the threaded port in the spool piece. A common mechanical seal for this application is a face-seal which includes a seal material compressed between two opposing metal surfaces. Where such seals are used in systems conveying liquid natural gas (LNG), the seals must operate at a temperature near minus 170 degrees Celsius and are commonly made from Teflon®. At such extreme temperatures, the seal material may lack the required resiliency. Further, the two metal surfaces contacting the seal material must have a very fine surface finish, requiring a hand-polishing process to achieve the necessary smoothness. Thus, the use of mechanical seals for installation of a transducer housing in a meter through which LNG is conveyed involves manufacturing complications and potential modes of failure. Therefore, it would be beneficial to implement a method of coupling and sealing a transducer housing to a meter body that would prevent hydrocarbon leakage without the use of threads and a removable seal material.

BRIEF SUMMARY OF THE DISCLOSURE

These and other needs in the art are addressed by apparatus and methods disclosed herein. In one embodiment, a welding fixture for releasably engaging a weldable object is disclosed. The fixture comprises a support body having a first end and at least one fluid passage, and a receiver coupled to the support body, wherein the receiver includes an internal chamber configured to receive the weldable object. The fixture further includes at least one fluid delivery tube disposed along at least a portion of the receiver and in fluid communication with the fluid passage. The fixture allows the weldable object to be precisely positioned and secured in the position for welding, and further supplies a fluid delivery system for delivering inert gas to the weld site adjacent to the weldable object.

In another embodiment, an assembly for insertion in a meter body comprises a support body having a plurality of fluid chambers and a manifold in fluid communication with the fluid chambers. A receiver is coupled to the support body and has a chamber that receives a transducer housing that is disposed at least partially within the chamber. The assembly includes fluid delivery tubes disposed along the receiver and that are in fluid communication with the fluid chambers and the manifold of the support body. The assembly is configured to position appropriately the transducer housing in a through-bore formed in a meter body, and to allow the housing to be welded and sealed to the meter body.

Thus, embodiments described herein comprise a combination of features intended to address various shortcomings associated with certain prior devices, systems, and methods. The various characteristics and features described above, as well as others, will be readily apparent to person having ordinary skill in the art upon reading the following detailed description, and by referring to the accompanying drawings.

BRIEF DESCRIPTION OF THE DRAWINGS

FIG. 5 is a cross-sectional side view of the welding fixture of FIG. 4;

FIG. 6 is a side view of a spacer member that is used in conjunction with the welding fixture shown in FIG. 5;

DETAILED DESCRIPTION OF THE DISCLOSED EMBODIMENTS

Figure 1:
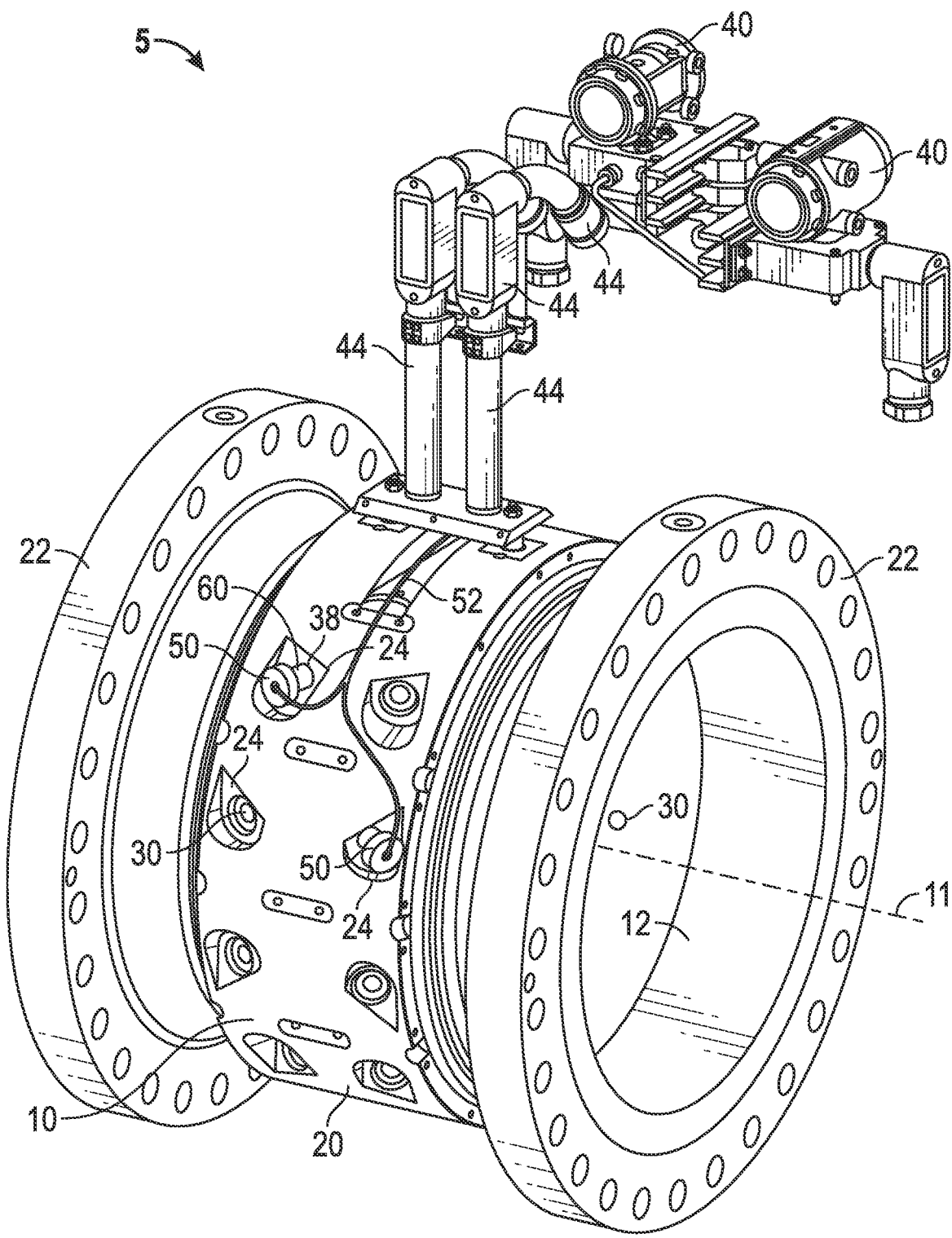
FIG. 1 is a perspective view of an embodiment of a flow meter having transducers in accordance with principles described herein.

The following description is exemplary of embodiments of the invention. These embodiments are not to be interpreted or otherwise used as limiting the scope of the disclosure, including the claims. One skilled in the art will understand that the following description has broad application, and the discussion of any embodiment is meant only to be exemplary of that embodiment, and is not intended to suggest in any way that the scope of the disclosure, including the claims, is limited to that embodiment.

The drawing figures are not necessarily to scale. Certain features and components disclosed herein may be shown exaggerated in scale or in somewhat schematic form, and some details of conventional elements may not be shown in the interest of clarity and conciseness.

The terms "including" and "comprising" are used herein, including in the claims, in an open-ended fashion, and thus should be interpreted to mean "including, but not limited to . . . ." Also, the term "couple" or "couples" is intended to mean either an indirect or direct connection. Thus, if a first component couples or is coupled to a second component, the connection between the components may be through a direct engagement of the two components, or through an indirect connection that is accomplished via other intermediate components, devices and/or connections.

In some of the figures, one or more components or aspects of a component may be not displayed or may not have reference numerals identifying the features or components that are identified elsewhere, in order to improve clarity and conciseness of the figure.

In addition, as used herein, the terms "axial" and "axially" generally mean along or parallel to a given axis (e.g., central axis of a body or a port), while the terms "radial" and "radially" generally mean perpendicular to the axis. For instance, an axial distance refers to a distance measured along or parallel to the axis, and a radial distance means a distance measured perpendicular to the axis. Furthermore, in the following disclosure and in the claims, "fluid" refers to a liquid, a gas, or a mixture of liquid and gas.

An Embodiment of a Meter Having a Welded Transducer Housing

Referring to FIG. 1, a partially assembled, exemplary embodiment of an ultrasonic flow meter 5 includes a meter body or spool piece 10 suitable for placement between aligned sections of a pipeline, one or more transducers 50, a pair of flanges 22, and at least one electronics housing 40. Electronics housing 40 is preferably a sealed enclosure. Housing 40 is coupled indirectly to meter body 10 by conduit 44. However, in other embodiments, housing 40 is coupled directly to meter body 10. Further, although meter 5 shown in FIG. 1 is an ultrasonic flow meter for liquid natural gas, this disclosure and the principles described herein apply equally to a wide range of meters, including, for example, gas ultrasonic flow meters, laser Doppler velocimetry systems, and probes measuring the thermodynamic properties of a static or flowing fluid, and this disclosure also applies to other systems requiring welding that is similar to the welding explained herein.

Meter body 10 is a tubular member that includes a generally cylindrical, hollow section with an outer surface 20, a longitudinal axis 11, and an interior flow passageway 12 through which the flow of a fluid may be measured. Typically, body 10 is cast or forged and then machined to its final form; however, it may be formed by any suitable manufacturing technique. Each end of meter body 10 is coupled to a flange 22. Flanges 22 are adapted for connection to corresponding flanges (not shown) on pipeline sections.

Figure 2:
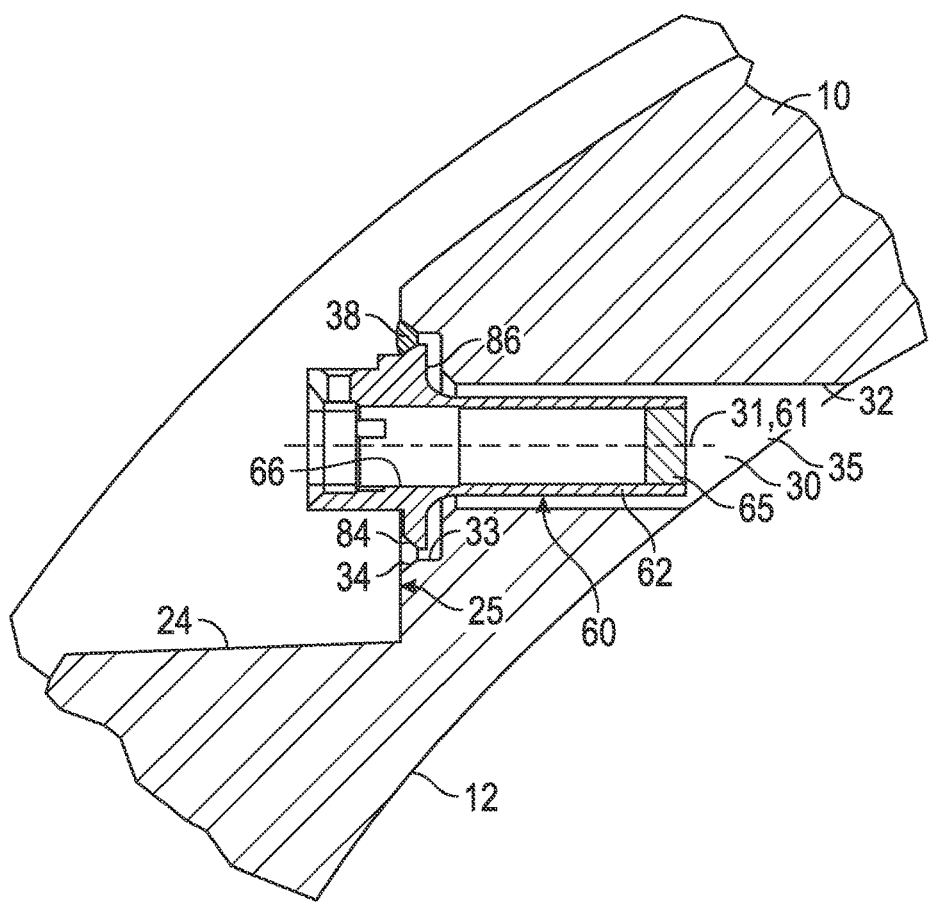
FIG. 2 is a cross-sectional view of a portion the meter of FIG. 1, showing a transducer housing in a transducer port.

In the embodiment of FIG. 1, the outer surface 20 of meter body 10 includes a plurality of recesses or transducer pockets 24. Ultimately, a transducer assembly 50 is disposed in each transducer pocket 24. In the remainder of this document, transducer assemblies 50 will be simply called transducers 50. Each pocket 24 connects to a transducer port 30, which is a through-bore in body 10, extending to interior flow passageway 12. As shown in FIG. 2, each transducer port 30 is configured to receive and couple a transducer housing 60 by an annular weld bead 38 between weld chamfer 34 of transducer port 30 and weld chamfer 34 of housing 60. Weld 38 is visible in FIG. 1, but only a portion of weld bead 38 is shown in FIG. 2. Transducer housing 60 is configured to slidingly receive a transducer 50 and prevent loss of fluid from port 30. A portion of one or more of the transducer housings 60 may extend into interior flow passageway 12.

Returning to FIG. 1, transducer 50 is electrically coupled to circuitry within an electronics housing 40 by one or more cables 52, which pass through conduit 44. The circuits in an electronics housing 40 may be configured to perform any or all of the following tasks: receive, amplify, adjust, condition, store, and transmit data from one or more transducers 50. Transducers 50 may include a variety of transducer types, including thermocouple, pressure transducer, laser, or ultrasonic flow sensor elements, or a combination of these types, for example. In the exemplary embodiment of FIG. 1, transducers 50 comprise ultrasonic flow sensor elements and are preferably transceivers, capable of both sending and receiving sonic energy. The sonic energy is capable of predictable interaction with a flow of fluid in meter 5. Meter body 10 is configured for retaining multiple pairs of opposing transducers 50. The members of a given pair of transducers 50 are disposed in pockets 24 and ports 30 on opposite sides of meter body 10 in order to facilitate the exchange of sonic energy between the transducers in the pair.

FIG. 2 shows a cross-sectional view of a portion of meter body 10 with a transducer pocket 24 and a generally cylindrical transducer housing 60 inserted and aligned with central axis 31 of transducer port 30. Transducer pocket 24 includes a mating face 25 disposed perpendicular to central axis 31. Port 30, comprises a primary bore 35, a concentric counter-bore 33 and a concentric weld chamfer 34 disposed adjacent pocket 24. Borehole wall 32 extends through port 30, comprising the surfaces of primary bore 35, counter-bore 33, and weld chamfer 34.

Figure 3:
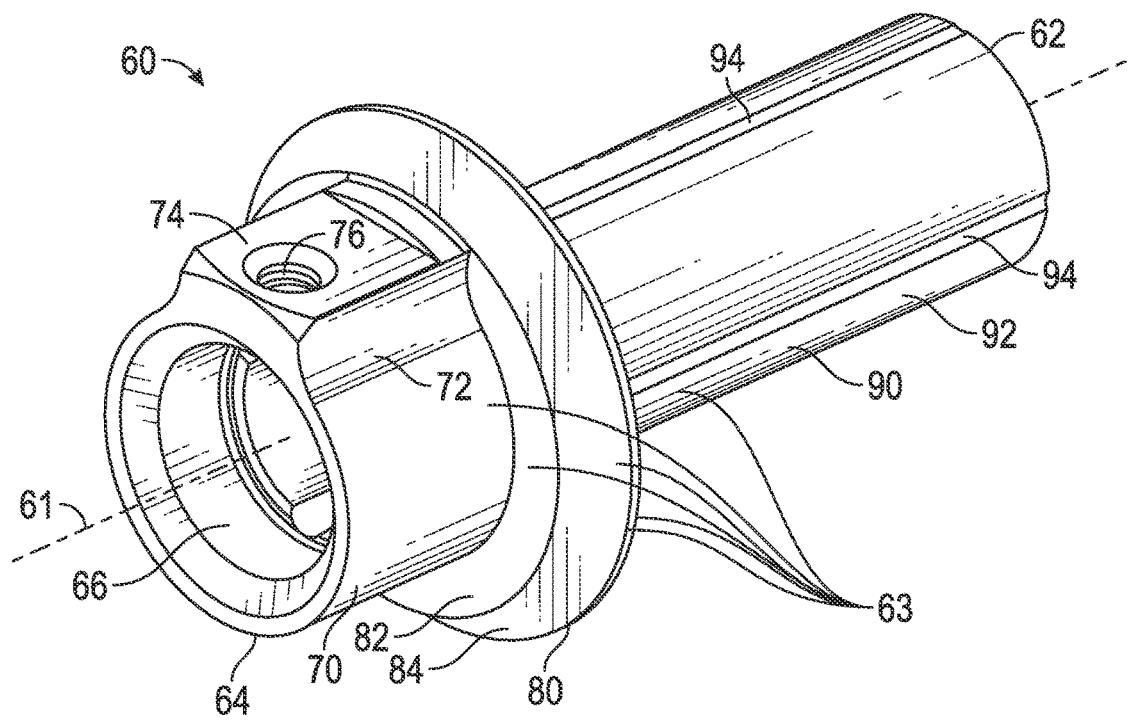
FIG. 3 is a perspective view of the transducer housing shown in of FIG. 2.

Referring to FIG. 2 and also to FIG. 3, transducer housing 60 comprises a central axis 61, a sealed-end 62, an outer surface 63, an open-end 64, a sealing plate 65 at sealed end 62, a multi-featured central bore 66, a cylindrical head 70, a flange 80, and a tubular extension 90. Central bore 66 extends from sealed-end 62 to open-end 64. Central bore 66 is sealed by plate 65 at end 62 and is configured to receive a transducer 50 (FIG. 1) inserted through open end 64. In at least one configuration, after a first portion of transducer 50 is received and coupled within bore 66, a second portion of transducer 50 protrudes beyond open end 64. In one or more other configurations, the entirety of transducer 50 is disposed within bore 66. Cylindrical head 70 is disposed at the open-end 64 of housing 60 and comprises a radially extending, generally rectangular boss 72. Boss 72 comprises a flat upper surface 74 and a through-bore 76, which extends radially to central bore 66. In the embodiment shown in FIG. 3, through-bore 76 is threaded. Tubular extension 90 extends from sealed end 62 towards cylindrical head 70 and comprises an outer surface 92 having a diameter less than the diameter of the through-bore that is transducer port 30. Axially-extending grooves 94 are disposed in outer surface 92 and reach sealed end 62. Preferably, grooves 94 are circumferentially and evenly spaced from one another around outer surface 92. Although only two grooves 94 are visible, the embodiment of FIG. 3 comprises four grooves 94. However, more or fewer grooves 94 can be employed. Radially extending flange 80 is disposed between cylindrical head 70 and tubular extension 90 with a planar annular face 82 adjacent head 70. A weld chamfer 84 is disposed adjacent face 82.

As shown in FIG. 2, sealing plate 65 is recessed within end 62 of housing 60. In various embodiments, the outer face of sealing plate 65 is disposed at one of these locations relative to the end 62 of housing 60: recessed (like FIG. 2), flush, or protruding. Sealing plate 65 is configured to transfer energy between a transducer 50 and a fluid within interior flow passageway 12. When fully assembled, an active element of transducer 50 contacts or couples the internal face of plate 65, possibly with intervening grease or another fluid. For the embodiment of FIGS. 1 and 2, sealing plate 65, is configured to couple a piezoelectric (i.e. ultrasonic) transducer element. Therefore, sealing plate 65 is configured to transmit ultrasonic vibrations between a fluid flowing in passageway 12 and transducer 50. In at least one embodiment, sealing plate 65 is preferably formed from glass that can withstand without damage the temperatures reached during the welding of a transducer housing 60 to a meter body 10. In some welding methods described herein, the temperatures of housing 60 and body 10 are maintained at a temperature that does not exceed 152° C. (305° F.).

Figure 4:
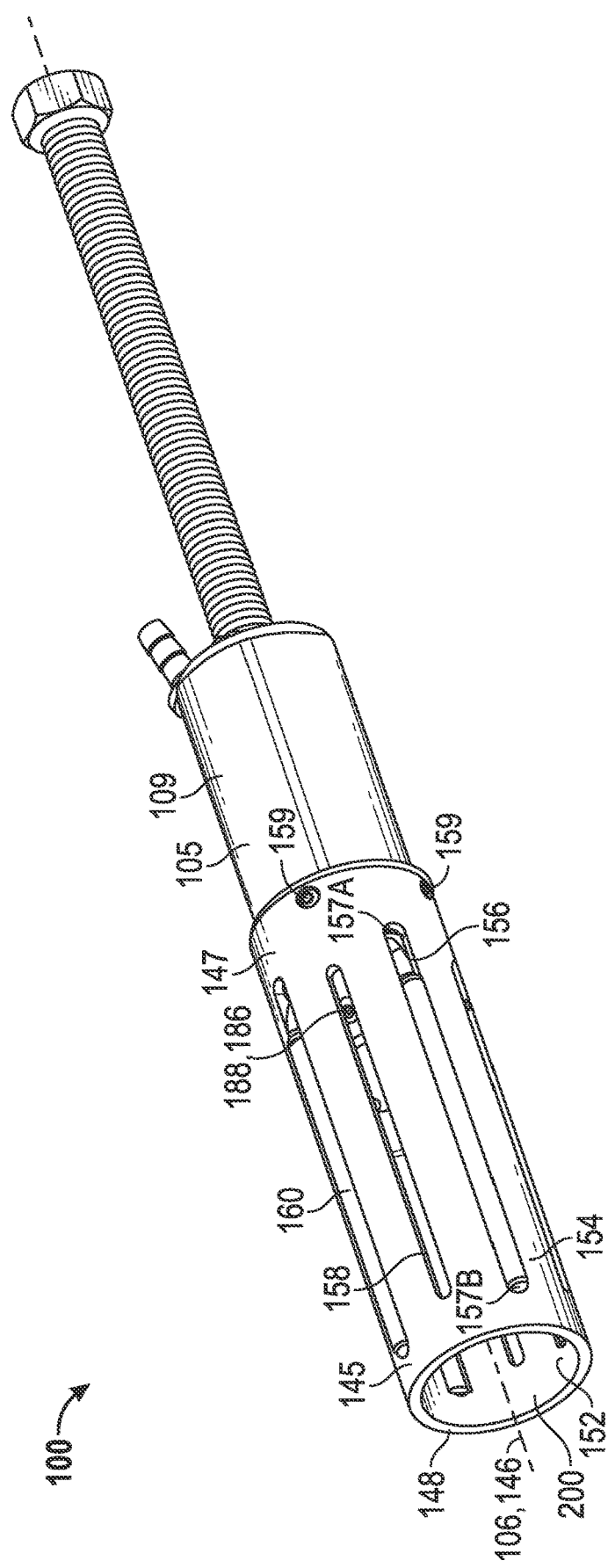
FIG. 4 is a perspective view of a welding fixture configured to hold the transducer housing of FIG. 3 in accordance with principles described herein.

An Embodiment of an Assembly Tool for a Meter Having a Welded Transducer Housing FIGS. 4 and 5 show a welding fixture 100. Welding fixture 100 is an assembly tool configured to engage and release a weldable object, such as transducer housing 60 or meter body 10 for example, and to provide a flow of inert gas during fabrication. Welding fixture 100 comprises a support body 105, a tubular-shaped keeper ring 145, a depth adjuster 165, and at least one fluid delivery tube, such as fluid delivery tube 160. Support body 105 comprises a central axis 106, a first end 107, a second end 108, an exterior surface 109, an axially aligned, central through-bore 110, and fluid passages 115. Support body 105 further includes internal threads 112 in a portion of through-bore 110 near second end 108, and a circumferential recess 114 adjacent exterior surface 109 at second end 108. Fluid passage 115 of support body 105 comprises a manifold groove 116 adjacent first end 107, and axially-extending chamber 118 extending from first end 107 to a location near to second end 108. The embodiment of FIG. 5 includes four fluid passages 115 and four, axially-extending chambers 118; although, fewer or more fluid passages 115 and chambers 118 can be employed.

Fluid passage 115 further comprises an annular end plate 130 covering manifold groove 116 and a hollow hose barb 132 threadingly coupled to end plate 130. Hose barb 132 is a tubular coupling configured to provide fluid communication between a hose or conduit connected to a gas supply (not shown) into manifold groove 116. A central through-hole 136 in end plate 130 is axially aligned with central through-bore 110. In some respect, annular end plate 130 has the appearance of a machine washer. One or more attachment screws 134 couple and seal end plate 130 to support body 105. An additional sealing material, such as rubber or flexible silicone, for example, is optionally disposed between plate 130 and body 105. At second end 108, a diagonal bore 120 passes from exterior surface 109 into each axially-extending chamber 118. The inlet end 126 of a bent transfer tube 125 extends into each diagonal bore 120 and is held by an interference fit, by solder, or other suitable holding means. The exit end 127 of each transfer tube 125 extends axially away from second end 108 of support body 105. Thus, chamber 118 of fluid passage 115, couples to and is in communication with transfer tube 125.

Referring to FIG. 4, tubular-shaped keeper ring 145 comprises a central axis 146, a first end 147, a second end 148, an inner surface 152, an outer surface 154, at least one axially-extending tube slot 156 configured to hold a tube, and a plurality of axially-extending pin slots 158. Keeper ring 145 is an example of a tubular receiver, configured to receive an object. Each tube slot 156 has a first end 157a near first end 147, and a second end 157b near second end 148. Referring now to FIG. 5, each tube slot 156 is aligned with a diagonal bore 120 and accommodates a transfer tube 125. During installation, exit end 127 of tube 125 slidingly engages and remains within tube slot 156 while inlet end 126 enters and couples with an aligned diagonal bore 120, as explained earlier. Each pin slot 158 slidingly engages an alignment pin 188 coupled to spacer plate 180, described more fully below with reference to depth adjuster 165. The keeper ring 145 shown in FIGS. 4 and 5 includes four circumferentially spaced tube slots 156 and four circumferentially spaced pin slots 158; although, fewer or more tube slots 156 and pin slots 158 can be employed. Axially-extending slots 156, 158 also extend radially from the outer surface 154 to the inner surface 152. A plurality of fasteners 159 couple the keeper ring 145 to support body 105, with first end 147 engaged with exterior circumferential recess 114.

As shown in FIG. 5, depth adjuster 165 comprises a threaded rod or bolt 170 and a round spacer plate 180. Threaded rod 170 comprises a first end 172 with a hexagonal head or another suitable tool engagement feature, and a second end 173 that is flat or rounded. As best shown in FIG. 6, spacer plate 180 comprises a central axis 181, a first end 182, a second end 183, and a generally cylindrical outer surface 185 with circumferentially spaced pin holes 186 configured to hold alignment pins 188 (FIG. 4). The embodiment of FIG. 4 includes four pin holes 186 and four alignment pins 188; although, fewer or more tube pin holes 186 and pins 188 can be employed. Referring again to FIG. 6, second end 183 includes an axially aligned, cylindrical recess 190 leaving an annular lip 192. Grooves 194 extend axially along outer surface 185 passing through ends 182, 183, one groove 194 for each transfer tube 125 coupled to support body 105. The embodiment of FIG. 6 includes four grooves 194 to provide clearance when spacer plate 180 moves within keeper ring 145, as explained below.

As shown in FIGS. 4 and 5, depth adjuster 165 fits within the assembly of support body 105 and keeper ring 145. Threaded rod 170 aligns with central axis 106 and engages threads 112 of central through-bore 110. The spacer plate 180 also aligns with central axis 106 and is slidably disposed within inner surface 152 of tubular keeper ring 145. Alignment pins 188 slidingly engage pin slots 158. The second end 173 of the threaded rod 165 rotationally engages first end 182 of spacer plate 180 and is thereby configured to push plate 180 axially within keeper ring inner surface 152. In some embodiments, threaded rod 165 couples to spacer plate 180 and is thereby configured both to push and to pull spacer plate 180. A cylindrical, receiving chamber 200 is formed within keeper ring 145 between second end 148 and the second end 183 of spacer plate 180. When threaded rod 165 rotates and pushes spacer plate 180 towards second end 148 of keeper ring 145, the length of receiving chamber 200 is reduced. When threaded rod 165 and spacer plate 180 move the opposite direction, away from second end 148, the length of receiving chamber 200 is increased. Thus, receiving chamber 200 is adjustable, having a variable length and therefore a variable volume.

In at least one embodiment, the spacer plate 180 is formed from copper material, which has a relatively high heat conductance. The spacer plate 180 of such heat conducting material may absorb heat from transducer housing 60 as the weld is being formed, helping to maintain housing 60 at a lower temperature than might otherwise result during the welding process. More specifically, to avoid possible damage to housing 60, the heat absorption by plate 180 may help maintain housing 60 below a predetermined upper temperature limit, which will be discussed again later.

Referring still to FIGS. 4 and 5, a fluid delivery tube 160 slidingly engages each transfer tube 125. More specifically, inlet end 162 of the delivery tube 160 surrounds exit end 127 of the transfer tube 125. The outer surface of delivery tube 160 slidingly and releasably engages an axially-extending tube slot 156 on keeper ring 145. Thus both the transfer tube 125 and the delivery tube 160 extend in a tube slot 156. The outside diameter of delivery tube 160 is greater than the annular thickness of keeper ring 145. Therefore, delivery tube 160 extends radially from the inner surface 152 to the outer surface 154 and extends beyond one or both of the surfaces 152, 154. Exit end 163 of delivery tube 160 is disposed near second end 148 of keeper ring 145. Delivery tube 160 is removable and replaceable. In the embodiment of FIG. 4, delivery tube 160 is formed from seamless tubing with a wall thickness substantially less than the tubing's diameter. Suitable tubing for delivery tube 160 includes tubing classified as hypodermic tubing. As with slots 156, the example embodiment of FIGS. 4 and 5 has four delivery tubes 160, evenly and circumferentially spaced around keeper ring 145.

Figure 7:
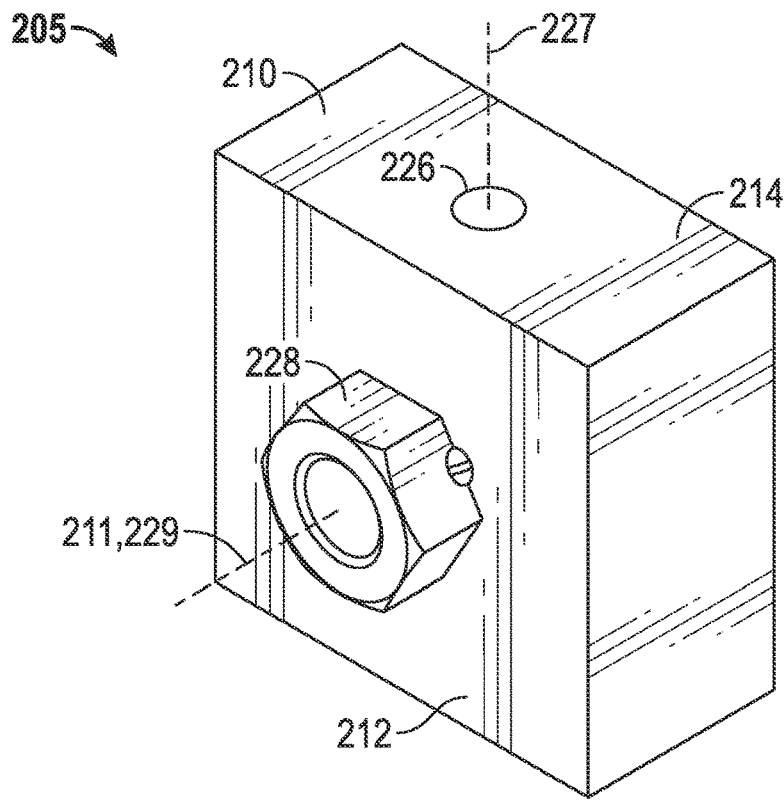
FIG. 7 is a perspective view of a insertion block configured to couple the transducer housing of FIG. 3 in accordance with principles described herein.
Figure 8:
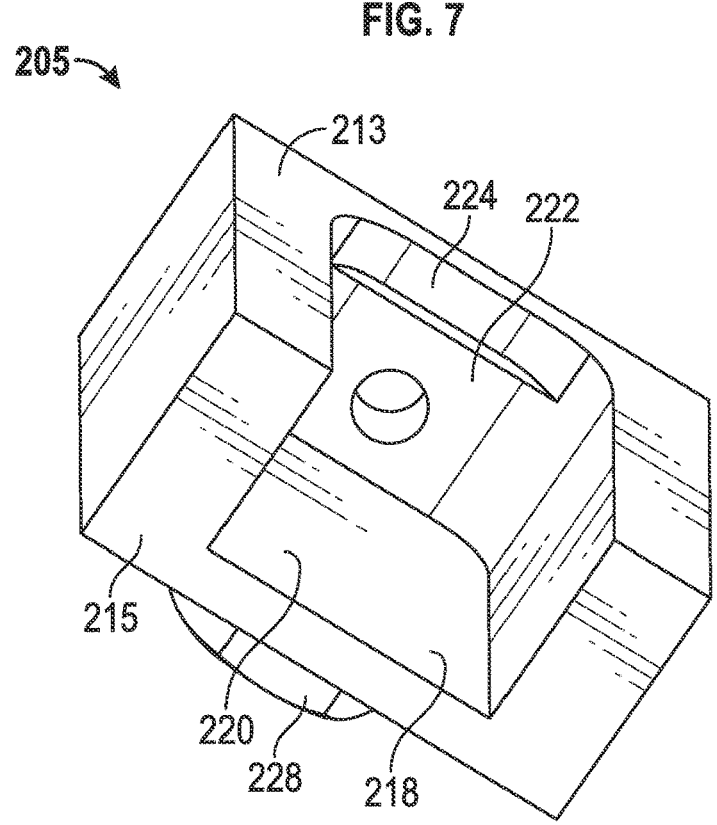
FIG. 8 is a perspective bottom view of the insertion block of FIG. 7.

FIGS. 7 and 8 present an insertion block 205, which acts as a tool to set the depth and the rotational alignment of a transducer housing 60 when installing the housing 60 in a meter body 10. Insertion block 205 comprises a generally rectangular rigid body 210 with a rotational axis 211 extending perpendicular to a front end 212. A hex-head nut 228 couples front end 212 with nut central axis 229 aligned with axis 211. While nut 228 is used in the embodiment of FIG. 7, any suitable tool engagement feature could be used. For example, nut 228 could be modified or replaced by a recess that receives a multi-sided tool such as an Allen wrench or a hexalobular internal driving feature, i.e. a Torx wrench.

Rigid body 210 further includes a primary recess 218 extending through back end 213 and bottom end 215. Recess 218 comprises a front surface 220 and a flat upper engagement surface 222. Surface 222 is disposed perpendicular to front end 212 and parallel to top end 214 of rigid body 210. An aperture 226 passes between top end 214 and upper engagement surface 222. The central axis 227 of aperture 226 is perpendicular to surface 222. Although shown as a round hole in the example of FIG. 7, in at least one other embodiment, aperture 226 is elongated in the direction of axis 211. In the embodiment of FIG. 8, a second recess 224 is disposed adjacent to primary recess 218, upper engagement surface 222, and back end 213. The various embodiments of insertion block 205 require the second recess 224 only if the boss 72 or another feature of transducer housing 60 requires extra clearance.

Figure 13:
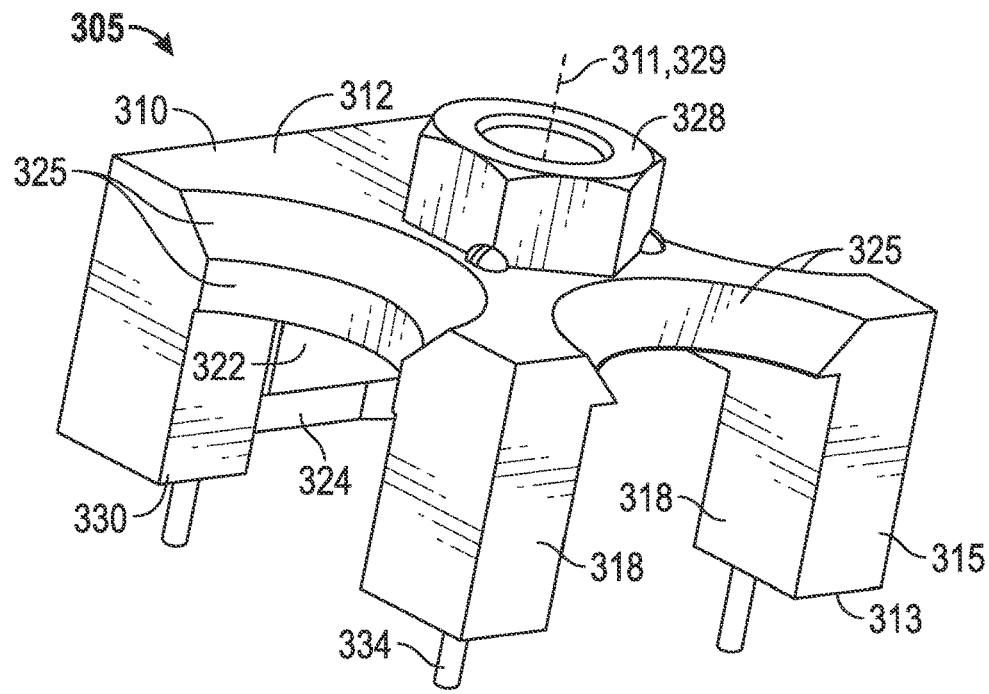
FIG. 13 is an isometric front view of another embodiment of an insertion block, this block having notches and configured to couple the transducer housing of FIG. 3 in accordance with principles described herein.
Figure 14:
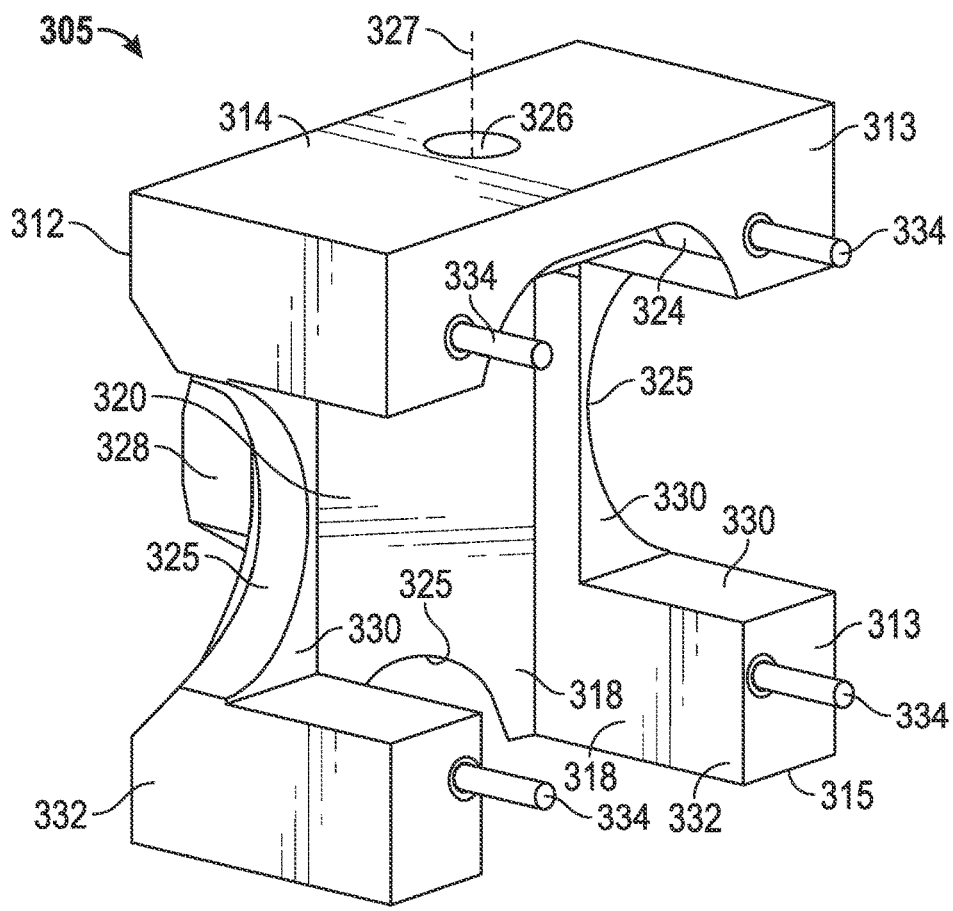
FIG. 14 is an isometric rear view of the insertion block shown in FIG. 13.

FIGS. 13 and 14 present a second insertion block 305, which is configured to function in sequence with insertion block 205 (FIG. 7), but may be used in lieu of block 205 in some methods. Insertion block 305 comprises a generally rectangular rigid body 310 with a rotational axis 311 extending perpendicular to a front end 312. A hex-head nut 328 couples front end 312 with nut central axis 329 aligned with axis 311. While nut 328 is shown in the embodiment of FIG. 13, any tool engagement feature could be used. For example, nut 328 could be modified or replaced by a recess that receives a multi-sided tool like a six-sided Allen wrench or a hexalobular internal driving feature, i.e. a Torx wrench.

Rigid body 310 further includes a primary recess 318 extending through back end 313 and bottom end 315. Recess 318 comprises a front surface 320 and a flat upper engagement surface 322. Surface 322 is disposed perpendicular to front end 312 and parallel to top end 314 of rigid body 310. An aperture 326 passes between top end 314 and upper engagement surface 322. The central axis 327 of aperture 326 is perpendicular to surface 322. A second recess 324 is disposed adjacent to primary recess 318, upper engagement surface 322, and back end 313. The various embodiments of insertion block 305 require the second recess 324 only if the boss 72 or another feature of transducer housing 60 requires extra clearance. In some embodiments, aperture 326 is threaded. Although shown as a round hole in the example of FIG. 13, in at least one other embodiment, aperture 326 is elongated along the direction of axis 311.

Distinct from insertion block 205, insertion block 305 includes one or more side recesses 330, that result in the formation of two leg-shaped features or, simply, legs 332, as shown in FIG. 14. Insertion block 305 further includes one or more semicircular recesses or grooves 325 extending between front end 312 and a recess 318, 330, along the direction of axis 311. Grooves 325 are disposed adjacent the outer periphery of front end 312. FIG. 13 shows three grooves 325 comprising a chamfer. Insertion block 305 further comprises multiple spacers extending from back end 313. In the embodiment shown in FIG. 14, four spacing pins 334 extend perpendicularly from back end 313. The relative locations of pins 334 is configured to allow pins 334 to slide adjacent flange 80 of transducer housing 60 and, thereby, to be circumferentially disposed around flange 80 when axes 61, 311 are aligned. More generally, spacing pins 334 are configured to be positioned around the perimeter of a flange such as flange 80.

Figure 9:
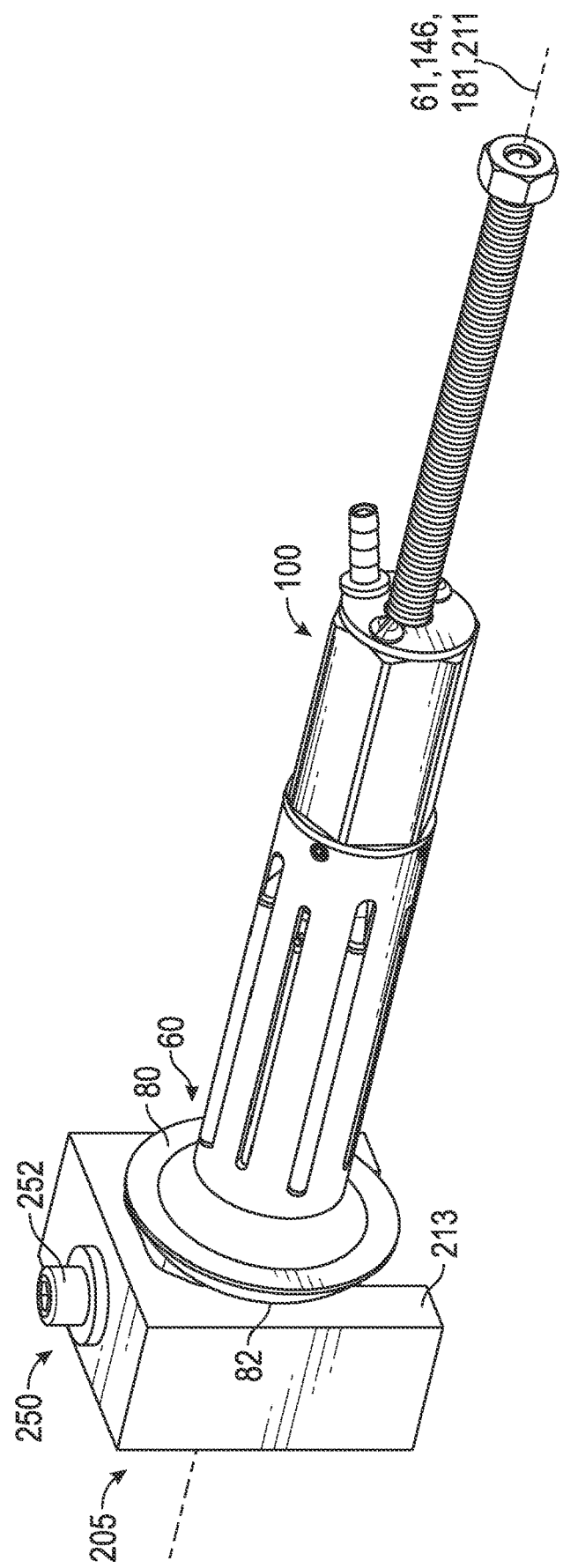
FIG. 9 is a perspective view of a fabrication assembly comprising the transducer housing of FIG. 3, the welding fixture of FIG. 4, and the insertion block of FIG. 7 in accordance with principles described herein.

Referring to FIG. 9, a method will now be described for welding transducer housing 60 in meter body 10. The method may be employed to weld other apparatus in addition to welding a transducer housing within a meter body. As shown in FIG. 9, transducer housing 60 couples with welding fixture 100 by slidingly engaging receiving chamber 200. To form the fabrication assembly 250 of FIG. 9, insertion block 205 is also coupled to transducer housing 60, slidingly engaging cylindrical head 70. The three components housing 60, welding fixture 100, and insertion block 205 are axially aligned. A removable pin or threaded fastener 252 couples housing 60 and insertion block 205 by means of aligned through-bore 76 and aperture 226, respectively. Fastener 252 limits the relative rotational movement and the relative axial movement of block 205 with respect to housing 60. In this embodiment, insertion block 205 is affixed to transducer housing 60 by means of fastener 252 to prevent relative movement between block 205 and housing 60. A portion of back end 213, which is an engagement surface on block 205, abuts face 82 on flange 80 of housing 60 so that block 205 is configured to push housing 60.

Figure 10:
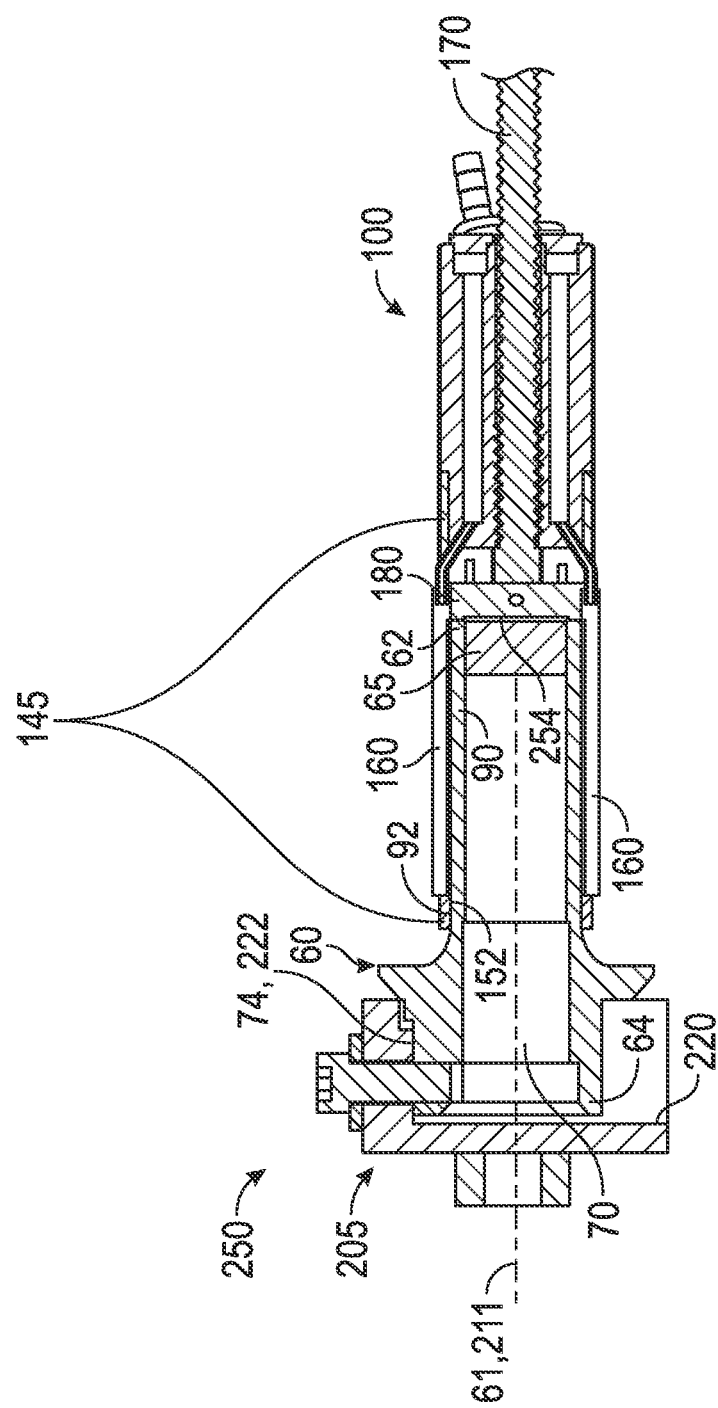
FIG. 10 is a cross-sectional view of the fabrication assembly of FIG. 9.

Referring to FIG. 10, additional aspects of fabrication assembly 250 will be described. On transducer housing 60, the outer surface 92 of tubular extension 90 slidingly and releasably engages fluid deliver tubes 160 and is received within inner surface 152 of keeper ring 145 of welding fixture 100 with an adequate clearance to allow disassembly. Stated broadly, keeper ring 145 releasably engages a weldable object. A fluid delivery tube 160 engages each groove 94 (FIG. 3) of housing 60 and protrudes radially beyond outer surface 154 of keeper ring 145. By rotation of threaded rod 170, spacer plate 180 (FIG. 5) abuts sealed-end 62 of housing 60 without touching sealing plate 65 by virtue of recess 190 (FIG. 6). Thus recess 190 leaves a gap 254 between spacer plate 180 and sealing plate 65. Gap 254 allows spacer plate 180 to contact end 62 of transducer housing 60 without contacting sealing plate 65. In some embodiments, sealing plate 65 may partially protrude from end 62 of transducer housing 60 while still not contacting spacer plate 180. At the open end 64 of transducer housing 60, insertion block 205 surrounds cylindrical head 70 with flat upper surfaces 74, 222 mutually engaging one another, and with axis of rotation 211 aligning with central axis 61. In this example, a clearance remains between open end 64 of housing 60 and front surface 220 of insertion block 205.

Figure 11:
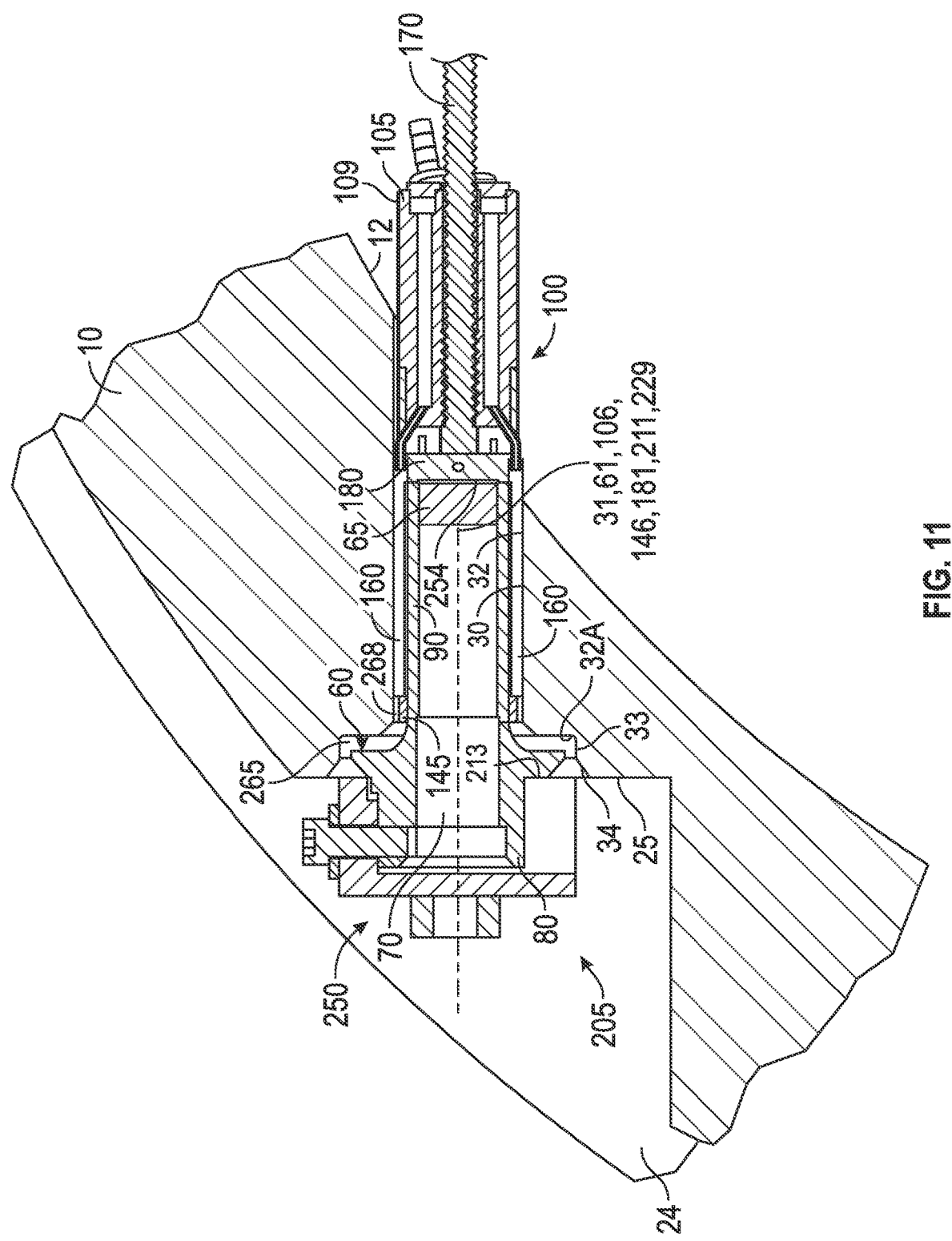
FIG. 11 is a cross-sectional view of the fabrication assembly of FIG. 9 disposed in a transducer port of the meter in FIG. 1.

FIG. 11 shows fabrication assembly 250 disposed within a transducer port 30 in meter body 10. To achieve the arrangement of FIG. 11, assembly 250 is disposed into port 30 from outside meter body 10, first passing into pocket 24. Threaded rod 170 enters port 30 first, followed by the other members of welding fixture 100 and a portion of transducer housing 60. Depending on its length, threaded rod 170 protrudes more or less into interior flow passageway 12 of meter body 10. In some cases, the installation process will require that the one or more fluid delivery tubes 160 be held by hand (not shown), by an elastic band (not shown), or by another means so as not to be displaced from tube slots 156 by a bending moment (a force acting about a convenient axis of rotation) or by axially-directed friction caused by sliding contact with borehole wall 32. Once delivery tubes 160 are partially inserted within transducer port 30, delivery tubes 160 will remain within tube slots 156, being held against axial friction by the contact between exit ends 163 and second ends 157b.

Fluid delivery tube 160 protrudes radially beyond outer surface 154 of keeper ring 145 to a diameter greater than the diameter of transducer port 30 of meter body 10. Consequently, during installation, tube 160 is partially compressed between the wall 32 of port 30 and transducer housing 60. In embodiments having more than one fluid delivery tube 160, such as the example of FIG. 11, the even, circumferential spacing and compression of the fluid delivery tubes 160 keeps fabrication assembly 250 axially aligned and centered within port 30. A generally annular gap 268 exits between outer surfaces 154, 109 of welding fixture 100 and the borehole wall 32 of transducer port 30, except in locations where a fluid delivery tube 160 is positioned. Therefore, gap 268 is disposed within the region between outer surface 63 of transducer housing 60 and borehole wall 32. Gap 268 extends axially with respect to central axes 31 of port 30 and axis 146 of keeper ring 145. Gap 268 communicates with central flow passage 12. The plurality of fluid delivery tubes 160 in the exemplary embodiment represented by FIGS. 4 and 11 divides gap 268 into a plurality of circumferentially spaced segments.

During assembly, the fabrication assembly 250 slides into transducer port 30 until back end 213 of insertion block 205 contacts mating face 25 in transducer pocket 24, making back end 213 and mating face 25 coplanar, meaning they are mutually aligned. Consequently, face 82 of flange 80, which may be pushed by back end 213, also becomes coplanar with mating face 25. An annular cavity 265 is formed between flange 80 and counter-bore 33 in transducer port 30. Therefore, cavity 265 comprises a region between outer surface 63 of transducer housing 60 and a portion 32A of borehole wall 32. Cavity 265 is adjacent weld chamfers 34, 84. Cavity 265 is in fluid communication with gap 268 and central flow passage 12 to permit gas flow therebetween. Prior to and during an initial phase of welding, cavity 265 communicates with weld chamfers 34, 84 and pocket 24 to allow gas flow there through.

Referring still to FIG. 11, the radial compressive forces between the partially compressed fluid delivery tubes 160, transducer port 30, and transducer housing 60 is capable of providing an axially-directed frictional force that resists axial movement. To achieve the arrangement of FIG. 11, the axial resistance is overcome by the insertion force exerted by a person or machine when sliding fabrication assembly 250 into port 30. When the insertion force ceases, the axial frictional force is sufficient to hold assembly 250 within port 30 during the subsequent welding process. At this point in the process, insertion block 205 is removed from housing 60, resulting in the arrangement shown in FIG. 12. However, in some instances, insertion block 205 remains attached to housing 60 until spot welds are applied, as will be explained later.

Figure 12:
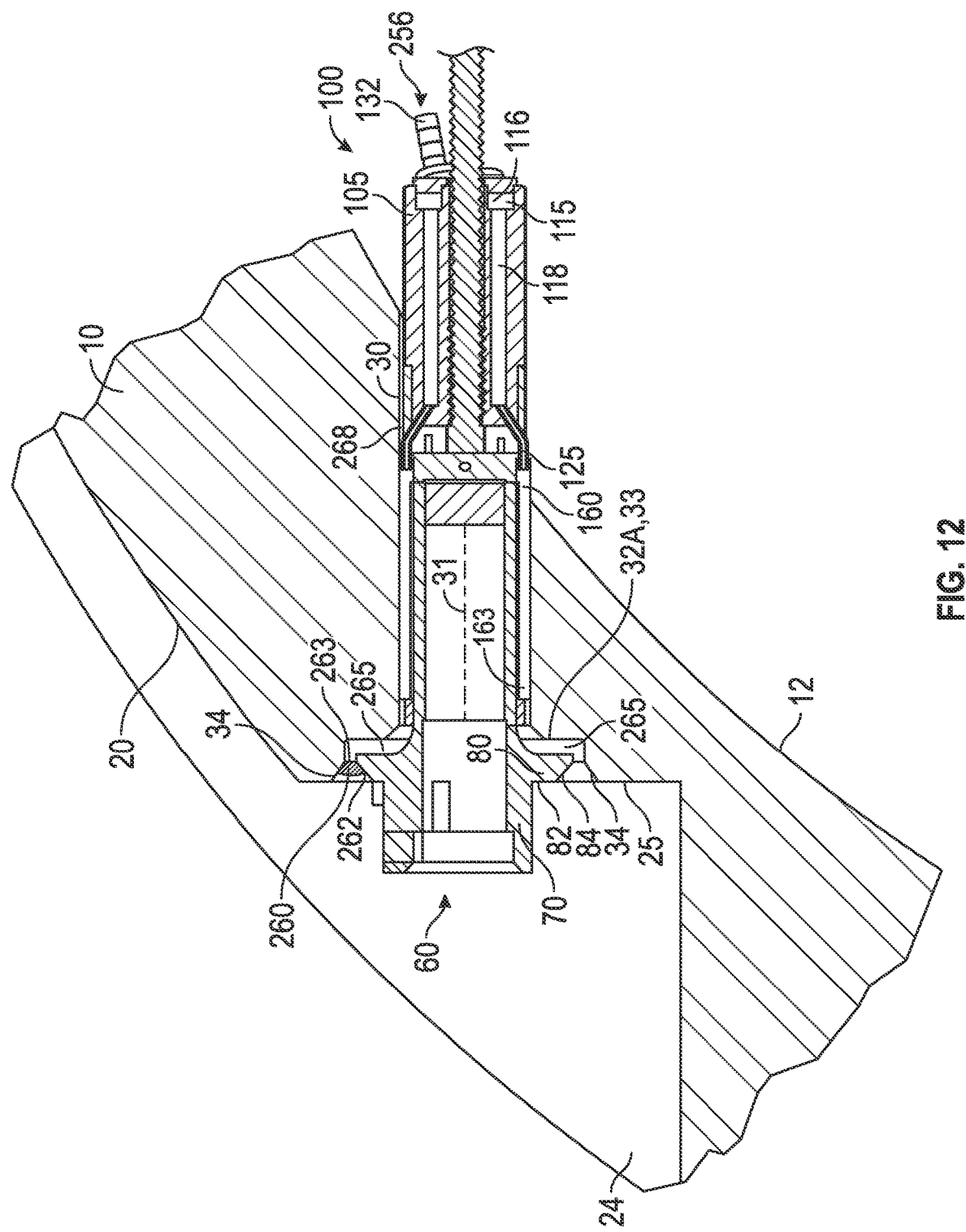
FIG. 12 is a cross-sectional view of the fabrication assembly, similar to FIG. 11, but with the insertion block of FIG. 7 removed in preparation for welding.

FIG. 12 presents a cross-sectional view of the assembly of transducer housing 60 and welding fixture 100 installed in a transducer port 30 of meter body 10. Face 82 of flange 80 is substantially coplanar with mating face 25 of pocket 24. Weld chamfers 34, 84 are substantially concentric and adjacent one another, ready to receive a welding bead by means of a welding machine or a torch. Tungsten-inert-gas (TIG) welding is preferred for welding transducer housing 60 into meter 5. During fabrication, welding occurs in a welding zone, which comprises weld chamfers 34, 84. For TIG welding, an inert gas, such as argon, is conveyed to the weld zone before and during welding to achieve a better weld bead by removing air and heat. In some cases, the inert gas flow to the weld zone is continued for a time period after the weld is completed to provide additional cooling.

In FIG. 12, a weld bead 260 is disposed between portions of weld chamfers 34, 84. To clarify other features, only a portion of weld bead 260 is shown. During welding, the TIG tool (not shown) is disposed on the left side of FIG. 12, reaching into transducer pocket 24 from the outside. The TIG tool provides a flow of inert gas to the front side of the weld zone and ultimately to the front side 262 of the weld bead 260 formed therein. Welding fixture 100 provides a separate flow of inert gas 256 to the back side of the weld zone and ultimately to the back side 263 of weld bead 260 as follows. Inert gas 256 enters hose barb 132 by means of a hose connected to a pressure regulator on a source of compressed gas (not shown). From hose barb 132, the inert gas 256 enters support body 105 through fluid passage 115, travelling through manifold groove 116, which distributes flow 256 to the four chambers 118. From each chamber 118, inert gas 256 enters one of the four delivery and transfer tubes 125 and into the four delivery tubes 160, exiting from ends 163 and entering the annular cavity 265 between flange 80 and counter-bore 33 of transducer port 30.

In some embodiments of the welding method, weld bead 260 starts as one or more tack welds, or equivalently, spot welds, which are small welds at discrete points circumferentially spaced around the perimeter of flange 80 and the circumference of port 30. When this technique is used, the spot weld(s) stabilizes the position of transducer housing 60 before a full circumferential weld is built.

In some embodiments of the disclosed welding method, no insertion block is attached to housing 60 during the fabrication of tack welds. In other embodiments, insertion block 205 remains attached to housing 60 (FIG. 11) until one or more spot weld(s) is formed. In still other embodiments of the method, a second insertion block, such as insertion block 305 (FIG. 13), replaces block 205, slidingly engaging cylindrical head 70 of housing 60 prior to applying the spot welds. The installation of insertion block 305 is similar to the installation of insertion block 205 shown in FIG. 11. However, spacer pins 334 are adapted to maintain concentric spacing between flange 80 and counter-bore 33 of port 30 in preparation for spot welding. When block 305 is coupled to housing 60 in a meter body 10, spacing pins 334 extend past weld chamfer 34 and slidingly engage counter-bore 33. The additional grooves 325, side recesses 330, and primary recess 318 of block 305 are adapted, separately or together, to allow a welding tool (not shown) to access weld chamfers 34, 84. Thereby, grooves 325 and recesses 330, 318 are adapted to facilitate the fabrication of one or more spot welds between transducer housing 60 and flow meter body 10. After the tack weld or welds are formed, the insertion block 205, 305, if installed, is removed.

Referring again to FIG. 12, weld bead 260 is built as a series of successive, circumferential weld layers around the perimeter of flange 80 and port 30. Weld bead 260 is built outward, toward mating face 25 and possibly beyond it. The first circumferential weld layer (not individually shown) is called the root pass. Before and while fabricating the root pass of weld bead 260, a portion of the flow of the inert gas 256 from welding fixture 100 exits outward from meter body 10, passing through cavity 265, between weld chamfers 34, 84, and toward outer surface 20. Another portion of inert gas 256 passes inward through gap 268 and into interior flow passageway 12 of meter body 10. When the root pass is completed and weld bead 260 is annular, spanning the circumference of weld chamfers 34, 84, then, preferably, cavity 265 is sealed at one end by weld bead 260. When cavity 265 is sealed at one end, inert gas flow 256 no longer passes outward between chamfers 34, 84 but maintains communication with cavity 265 and travels through gap 268, exiting into interior flow passageway 12. As welding proceeds, weld bead 260 reaches the intermediate thickness shown in FIG. 12. The application of weld layers continues until weld bead 260 reaches a targeted thickness, possibly extending beyond mating face 25, as does full-depth weld bead 38 in FIG. 2. The strengthening of weld bead 260 and the sealing of housing 60 to port 30 are completed.

During various welding methods, at least one of (a) inert gas flow 256 and (b) a resting time period without welding is used to maintain housing 60 and body 10 below a predetermined upper temperature limit to avoid possible damage to housing 60, body 10, or weld 38, 260. In some welding methods, the temperatures of housing 60 and body 10 are maintained at a temperature that does not exceed 152° C. (305° F.). This may be accomplished by intermittently welding, and not welding for appropriate periods of time. Periods in which welding is not being performed allows heat to be conveyed away from housing 60 and body 10 via conduction and convection. Cooling may be enhanced by continuing the flow of inert gas during the period(s) in which welding is not performed, which may include time after the welding is completed.

As a weld bead cools, it shrinks. The shrinkage of weld bead 260 pulls transducer housing 60 inward, along axis 31 toward interior flow passageway 12. As a result, face 82 of flange 80 moves and ceases to be aligned with mating face 25. In some embodiments, transducer housing 60, including flange 80, moves a distance of 0.040 inch toward passageway 12 along axis 31 due to shrinkage of weld bead 260. Therefore, prior to installation and welding, the length of transducer housing 60 is appropriately specified in order to achieve accurate placement of sealed end 62 within port 30 after the weld bead cools. During cooling of weld bead 260, welding fixture 100 moves with housing 60. Thus, by prescribing an appropriate length for a weldable object, such as a transducer housing, during the early stages of fabrication, it is possible to compensate for the movement of a weld.

After weld bead 260 cools, welding fixture 100 is removed resulting in a configuration such as shown in FIG. 2. In some situations, welding fixture 100 will be easily pulled along axis 31 and into interior flow passageway 12 for removal. In other situations, threaded rod 170 will be turned to push spacer plate 180 against transducer housing 60, causing the remainder of welding fixture 100 to move relative housing 60, eventually releasing all of fixture 100 from housing 60 and port 30 for removal.

In some embodiments of the welding method, block 205 is not used to install the transducer housing 60 in meter body 10 as in FIG. 11. Instead, insertion block 305 is employed to form a fabrication assembly like assembly 250 (FIG. 9), to aid with the installation, and, optionally, to aid while a spot weld is made. In still other embodiments, no insertion block is used along with welding fixture 100 to couple housing 60.

Figure 15:
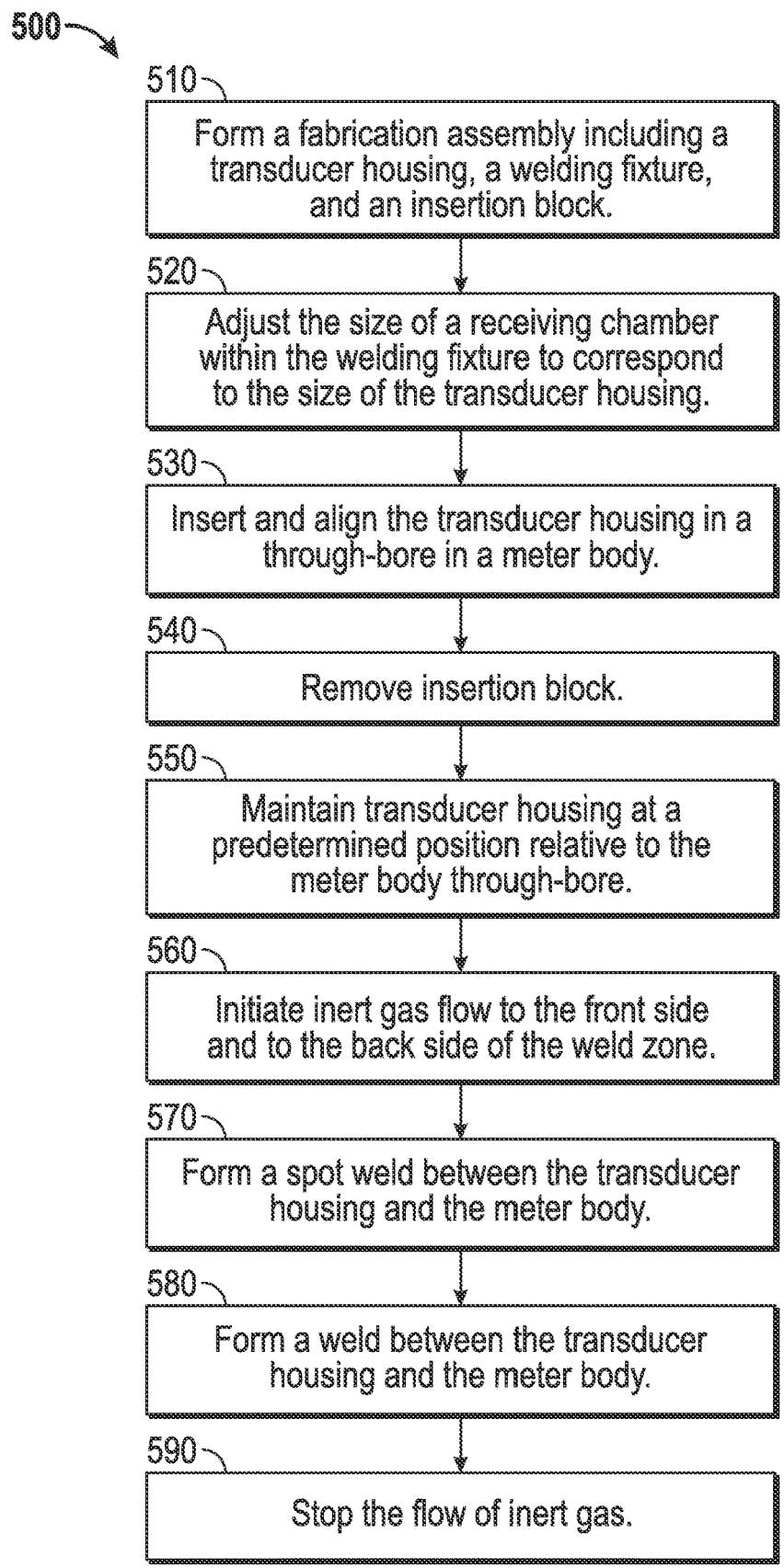
FIG. 15 is a simplified flow diagram of a method for forming a welded seal in accordance with principles described herein.

Referring now to FIG. 15, method 500 for forming a welded seal between a transducer housing 60 and meter body 10 or, more broadly, forming a welded seal between a weldable object and a generally tubular body is shown. Method 500 incorporates and summarizes many or all of the operations explained throughout this document. Overall, method 500 uses a welding fixture to position the weldable object and to augment the delivery of an inert gas during and, if preferred, after the welding. For this purpose, method 500 forms a fabrication assembly including a transducer housing, a welding fixture, and an insertion block at step 510. Method 500 adjusts the size of a receiving chamber within the welding fixture to correspond to the size of the transducer housing at step 520 and inserts and aligns the transducer housing in a through-bore in a meter body at step 530. The insertion block is removed at step 540. In step 550, the transducer housing is maintained at a predetermined position relative to the through-bore of the meter body. In preparation for welding, step 560 initiates inert gas flow to the front side and to the back side of the weld zone. The front side of the weld zone is, for example, the zone adjacent mating face 25 of transducer pocket 24. The rear side of the weld zone is, for example, the zone adjacent cavity 265. The timing and source of providing gas to the front side may vary as compared to the timing and source of providing gas to the back side. For example, inert gas 256 may flow from welding fixture 100 steadily throughout a welding procedure that includes alternating welding and cooling periods. In another example, inert gas is conveyed only to the front side when a welding tool is active. In another example, a steady flow of gas is provided to both the front side and to the back side of the weld zone throughout the welding procedure.

At step 570, a spot weld is formed between the transducer housing and the meter body. Step 580 forms a weld between the transducer housing and the meter body. For example, weld 38 in FIG. 1 circumferentially surrounds housing 60, coupling it to meter body 10. In some embodiments the weld is built in layers. After the weld is completed or after adequate cooling is achieved, the flow of inert gas is stopped at step 590. Other embodiments based on method 500 include more or fewer operations. For example, some method embodiments use no insertion block.

Unless expressly stated otherwise, the steps of a method in the disclosure or in a claim may be performed in any suitable order. The recitation of identifiers such as (a), (b), (c) or (510), (520), (530) in relationship to steps of a method in the disclosure or a method in a claim are not intended to and do not specify a particular order to the steps, but rather are used to simplify subsequent reference to such steps.

While exemplary embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible. Accordingly, the scope of protection is not limited to the embodiments described herein, but is only limited by the claims that follow, the scope of which shall include all equivalents of the subject matter of the claims.

What is claimed is:

1. A welding fixture for releasably engaging a weldable object, the fixture comprising:
    a support body;
    a receiver coupled to the support body, the receiver comprising an open end and an internal chamber;
    a weldable object received through the open end and within the internal chamber, the weldable object comprising an outer surface; and
    a fluid delivery tube extending into the support body to couple to a fluid supply, the fluid delivery tube further extending from the support body toward the receiver open end and disposed along at least a portion of the receiver such that the fluid delivery tube extends adjacent and parallel to the outer surface of the weldable object whereby a fluid exit end of the fluid delivery tube is disposed opposite the support body and radially outside of the weldable object such that a fluid is deliverable to the outer surface of the weldable object.

2. The welding fixture of claim 1 further comprising a gas supply coupled to the fluid delivery tube for delivering fluid through the tube.

3. The welding fixture of claim 2 further comprising a plurality of fluid delivery tubes spaced apart along the circumference of the receiver and in fluid communication with the gas supply.

4. The welding fixture of claim 1 wherein the receiver comprises at least one axially-extending slot receiving the fluid delivery tube.

5. The welding fixture of claim 4 wherein the chamber of the receiver includes an inner surface and an outer surface;
    wherein the at least one axially-extending slot extends radially from the outer surface to the inner surface; and
    wherein a fluid delivery tube disposed in the slot extends radially beyond the outer surface.

6. The welding fixture of claim 1 wherein the support body further comprises at least one fluid passage and
    wherein the at least one fluid passage is in fluid communication with the fluid delivery tube.

7. The welding fixture of claim 6 wherein the at least one fluid passage of the support body comprises at least one chamber coupled to at least one transfer tube.

8. The welding fixture of claim 7 further comprising:
    a plurality of fluid delivery tubes circumferentially spaced around the receiver.

9. The welding fixture of claim 1 further comprising:
    a through-bore in the support body;
    a threaded rod threadingly engaging the through-bore; and
    a spacer plate slidably disposed within the chamber of the receiver and engagable with one end of the threaded rod.

10. The welding fixture of claim 9 wherein the spacer plate is configured for non-rotational movement within the receiving chamber.

11. The welding fixture of claim 9 wherein the spacer plate comprises a recess forming a gap between the spacer plate and the weldable object.

12. The welding fixture of claim 1 further comprising an insertion block configured to couple to the weldable object, the insertion block comprising:
    a body;
    a recess in the body for receiving the weldable object; and
    at least a first engagement surface engaging the weldable object and configured to manipulate the position of the weldable object.

13. An assembly for insertion in a meter body, comprising:
    a support body comprising a plurality of fluid chambers and a manifold in fluid communication with the fluid chambers;
    a cylindrical receiver coupled to the support body and having an open end and a cylindrical receiving chamber;
    a cylindrical transducer housing disposed through the open end and at least partially within the cylindrical receiving chamber; and a plurality of fluid delivery tubes disposed along the cylindrical receiver such that the fluid delivery tubes are adjacent and parallel to the cylindrical transducer housing disposed in the cylindrical receiving chamber, the fluid delivery tubes in fluid communication with the fluid chambers and the manifold of the support body at one end and including a fluid exit at an opposite end radially outside of the cylindrical transducer housing such that a fluid is deliverable to the cylindrical transducer housing.

14. The assembly of claim 13 wherein the receiver comprises a plurality of elongate slots, and wherein the fluid delivery tubes are disposed in the slots.

15. The assembly of claim 13 wherein the receiver includes a cylindrical outer surface, and wherein the fluid delivery tubes engage the receiver and extend radially beyond the outer surface of the receiver.

16. The assembly of claim 13 further comprising a plurality of transfer tubes, each transfer tube coupling a fluid delivery tube to a fluid chamber such that the coupled fluid delivery tube and fluid chambers are in fluid communication.

17. The assembly of claim 13 further comprising a spacer plate slidably disposed within the receiving chamber of the receiver and configured for axial movement therein.

18. The assembly of claim 17 further comprising one or more pins disposed through slots in the receiver and coupled to the spacer plate, the pins configured to engage the sides of the slots to prevent rotation of the spacer plate within the receiving chamber.

19. The assembly of claim 17 further comprising:
a through bore in the support body; and
a rod disposed in the through bore and configured to bear against the spacer plate, such that axial movement of the rod in the through bore axially displaces the spacer plate in the receiver.

20. The assembly of claim 17 wherein the transducer housing comprises an end facing the spacer plate, the end having a central portion, wherein the assembly further comprises a gap between the spacer plate and the central portion.

21. The assembly of claim 20 wherein the spacer plate comprises a facing surface facing the housing end, and wherein the facing surface of the spacer plate comprises a recessed region.

22. The assembly of claim 13 wherein the transducer housing comprises a first end within the receiving chamber and a second end opposite the first end, the assembly further comprising an insertion block coupled to the second end of the transducer housing and having a recess receiving the second end.

23. The assembly of claim 22 wherein the insertion block further comprises at least a first engagement surface engaging the transducer housing and configured to manipulate the position of the transducer housing.

24. The assembly of claim 22 wherein the insertion block further comprises a fastener for coupling the transducer housing to the insertion block and preventing rotational movement therebetween.

25. The assembly of claim 22 wherein the insertion block further comprises a body and a recess extending through a side of the body and configured to allow access for a welding tool.

26. The assembly of claim 22 wherein the transducer housing comprises a flange adjacent the second end; and
wherein the insertion block further comprises a plurality of extending spacers configured to be disposed around the perimeter of the flange.

\* \* \* \* \*